(12) United States Patent
Smith et al.

(10) Patent No.: US 9,714,057 B2
(45) Date of Patent: Jul. 25, 2017

(54) PNEUMATICALLY ACTUATED AIR CONTROL DEVICES AND METHODS

(71) Applicants: Jeffrey P. Smith, Prosper, TX (US); Bruce Bezner, Lindsay, TX (US)

(72) Inventors: Jeffrey P. Smith, Prosper, TX (US); Bruce Bezner, Lindsay, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 14/707,816

(22) Filed: May 8, 2015

(65) Prior Publication Data
US 2016/0325791 A1 Nov. 10, 2016

(51) Int. Cl.
*B62D 35/00* (2006.01)

(52) U.S. Cl.
CPC ......... *B62D 35/001* (2013.01); *B62D 35/008* (2013.01)

(58) Field of Classification Search
CPC .............................. B62D 35/001; B62D 35/008
See application file for complete search history.

(56) References Cited

U.S. PATENT DOCUMENTS

| | | |
|---|---|---|
| 2,948,111 A | 8/1960 | Nelson |
| 4,582,278 A | 4/1986 | Ferguson |
| 4,702,509 A | 10/1987 | Elliott, Sr |
| 5,090,765 A | 2/1992 | Gremillion |
| 5,106,265 A | 4/1992 | Holzem |
| 5,375,903 A | 12/1994 | Lechner |
| 5,671,690 A | 9/1997 | Trost |
| 6,015,115 A | 1/2000 | Dorsett |
| 6,199,796 B1 | 3/2001 | Reinhard |
| 6,347,769 B1 | 2/2002 | To |
| 6,358,021 B1 | 3/2002 | Cabuz |
| 7,040,690 B2 * | 5/2006 | Soja ..................... B62D 35/005 296/180.5 |
| 7,762,615 B2 | 7/2010 | Dayton |
| 8,267,654 B2 | 9/2012 | van Dam |
| 8,678,324 B2 | 3/2014 | Hemmelgarn |
| 8,783,625 B2 | 7/2014 | Lutke |
| 8,870,125 B2 | 10/2014 | Balzer |
| 2011/0018298 A1 | 1/2011 | Oriet et al. |
| 2011/0116927 A1 | 5/2011 | Hancock |
| 2011/0163205 A1 | 7/2011 | Shepshelovich |
| 2011/0232291 A1 | 9/2011 | Luedke |
| 2014/0271192 A1 | 9/2014 | Brooks |

FOREIGN PATENT DOCUMENTS

KR 20130009326 A 1/2013

OTHER PUBLICATIONS

International Search Report and Written Opinion mailed Oct. 20, 2016, issued in corresponding International Application No. PCT/US2016/031327, filed May 6, 2016, 6 pages.

* cited by examiner

*Primary Examiner* — Glenn Dayoan
*Assistant Examiner* — Melissa A Black
(74) *Attorney, Agent, or Firm* — Christensen O'Connor Johnson Kindness PLLC

(57) ABSTRACT

A pneumatically actuated air control device is provided. The device includes a control surface that affects the air flow along the device, and an at least one pneumatic motor configured to alter or change the configuration or orientation of the control surface or sections thereof. The device is configured such that when selective air pressure is supplied to the at least one motor, the control surface or sections thereof changes its configuration or its orientation with respect to the air flow, thereby affecting the air flow with respect to the device.

8 Claims, 10 Drawing Sheets

PNEUMATICALLY ACTUATED AIR CONTROL DEVICES AND METHODS

BACKGROUND

Numerous means have been sought to improve the fuel-efficiency of moving bodies, and especially moving bluff bodies, by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo hauling tractor-trailer combination is one vehicle that experiences excessive aerodynamic drag. Generally described, tractor-trailer combinations typically include a tractor having a so-called fifth wheel by which a box-like semi-trailer may be articulatedly attached to the tractor for transportation of the semi-trailer. By providing the articulated connection via the fifth wheel, a space or gap is formed between the aft facing rear wall of the tractor cab and the forward facing front wall of the semi-trailer. It is well known that this gap, or the gap between succeeding trailers (not shown) of a tractor trailer combination causes wake regions and, as a result, aerodynamic drag.

Another reason for large pressure drag on tractor-trailer combinations is the configuration of the tractor front section, particularly, the presence of a sharp angle located at a lower edge of the truck bumper and the passage of airflow underneath the vehicle and associated trailer. At highway speeds, such underbody air flow interacts with undercarriage components, such as wheel assemblies, skid plates, oil pans, transmission housings, drive shafts, chassis structure, etc., which in turn, develops a substantial amount of turbulent airflow in the underbody region of the vehicle and/or trailer.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with an aspect of the present disclosure, an aerodynamic control device is provided. The device comprises a body defining a control surface, and at least one pneumatic motor carried by the body. The at least one pneumatic motor in one embodiment comprises a general U-shaped, sealed chamber, and at least one port configured to provide access into/out of the sealed chamber. At least one pneumatic motor is positioned with respect to the control surface such that pressurizing the sealed chamber via the port results in a change in configuration of at least a portion of the control surface.

In accordance with another aspect of the present disclosure, an aerodynamic control device is provided. The device comprises a body defining a control surface, and a plurality of pneumatic motors coupled to the body. Each pneumatic motor in one embodiment comprises a sealed chamber and at least one port configured to provide access into/out of the sealed chamber. The pneumatic motors in one embodiment are positioned with respect to the control surface such that pressurizing one or more of the plurality of sealed chambers via the respective ports results in a change in configuration of at least a portion of the control surface.

In accordance with another aspect of the present disclosure, a method is provided for changing the configuration of a control surface. The method comprises providing an aerodynamic device including a body that defines a control surface, at least one pneumatic motor coupled to the body. The at least one pneumatic motor comprises a sealed chamber and at least one port configured to provide access into/out of the sealed chamber. The method also includes sensing an aerodynamic condition, and changing the configuration of the control surface based on the sensed aerodynamic condition via supply of pressurized gas to the sealed chamber of the at least one pneumatic motor.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein.

DETAILED DESCRIPTION

Figure 1:
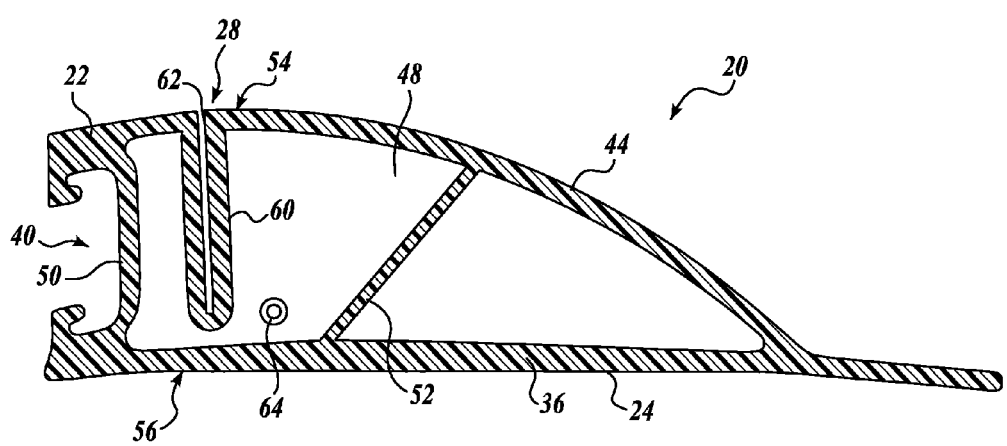
FIG. 1 illustrates one representative embodiment of an aerodynamic device in accordance with an aspect of the present disclosure.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed. Similarly, any steps described herein may be interchangeable with other steps, or combinations of steps, in order to achieve the same or substantially similar result.

The following discussion provides examples of devices and methods for improving the aerodynamic efficiency (e.g., reduce drag) on vehicles, such as class 8 tractor-trailer combinations. Generally described, various embodiments described herein are directed to techniques and methodologies for dynamically changing the configuration of a vehicle aerodynamic device, such as an air dam, a spoiler, a wing, an air deflector, a fairing, etc.

Embodiments of the present disclosure may find use, among others, in vehicles that experience different airflow conditions during use. For instance, a vehicle may experience cross winds ranging from a 3 degree yaw up to cross winds at a 20 degree yaw or more. Heretofore, vehicle aerodynamic devices are designed to perform based on some average wind condition (e.g., 3 degree yaw). However, these aerodynamic devices do not perform well over the entire range (0 degrees to 20 degrees or more).

Accordingly, embodiments of the present disclosure address this problem and others by being configured to dynamically alter the shape or configuration of the vehicle aerodynamic device so that it performs better over the entire range. To carry out this functionality, one or more embodiments set forth below may include one or more pneumatic motors that are incorporated into a vehicle aerodynamic device. In some examples, the device maintains its normal or non-activated state during certain vehicle operating conditions, such as wind conditions, tractor-trailer gap, etc., but in another vehicle operating conditions, an air deflection surface, sometimes referred to as the control surface, of the device changes configuration via activation of the pneumatic motor(s) to reduce drag.

The one or more pneumatic motors are described below in some embodiments as one or more inflatable bladders, chambers, etc., positioned within the device. Each pneumatic motor is configured to be coupled to a selective source of pressurized gas. In one embodiment, one or more sensors or the like are employed to sense air flow conditions, such as wind conditions, relative to the aerodynamic device. The one or more sensors can alternatively or additionally sense the gap distance between the tractor and the trailer. The output of the one or more sensors can be utilized in one embodiment by a controller and/or a valve arrangement for controlling delivery of pressurized gas to the pneumatic motors. For example, a predetermined amount of pressurized gas can be injected into the one or more pneumatic motors based on sensed wind conditions. As the pressurized gas enters the one or more pneumatic motors, the one or more pneumatic motors affect a corresponding change in the control surface of the aerodynamic device proportional to the pressure contained by the motor. Once, for example, the cross wind condition is removed, the pressurized gas can be vented from the one or more pneumatic motors, thus returning the aerodynamic device to its normal state. If instead the air flow condition changes in magnitude, a corresponding change in pressurized gas enters/exits the one or more pneumatic motors, thereby changing the control surface configuration of the aerodynamic device. This dynamic change allows for optimizing the drag reduction by the aerodynamic device during use.

Although some embodiments of the present disclosure will be described with reference to a Class 8 truck, one skilled in the relevant art will appreciate that the disclosed embodiments are illustrative in nature, and therefore, should not be construed as limited to applications with a Class 8 truck and/or trailer. It should therefore be apparent that the techniques and methodologies set forth by one or more representative embodiments of the present disclosure have wide application, and may be used in any situation where a reduction in the drag forces on a vehicle (e.g., passenger car or truck, RV, vessel, train, bus, trailer, etc.) is desirable. Additionally, it should therefore be apparent that the techniques and methodologies set forth by one or more representative embodiments of the present disclosure can be employed in any situation where dynamic control of the configuration of a surface or part may be desirable.

For the purposes of this detailed description, the term "substantially" when referencing a reference direction, such as "substantially align," "substantially aligned," "substantially parallel," "substantially coplanar," "substantially perpendicular," etc. shall be defined as an orientation that varies less than 30 degrees from the indicated reference direction. For instance, the term "substantially parallel" indicates that the inclination of the item in question deviates less than 30 degrees from a parallel orientation. Similarly, the terms "about," "approximately," "generally," etc., shall mean shall mean plus or minus 5% of the stated value or condition. It should be noted that for purposes of this disclosure, terminology such as "upper," "lower," "vertical," "horizontal," "fore," "aft," "inner," "outer," etc., should be construed as descriptive and not limiting the scope of the present invention, as claimed.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

Turning to FIG. 1, there is shown one representative embodiment of a pneumatically actuated air control device in the form of a vehicle side deflector 20 in accordance with aspects of the present disclosure. As shown in cross section, the vehicle side deflector 20 includes a control surface 24 that affects the air flow along the device, and an at least one pneumatic motor 28 configured to alter or change the configuration or orientation of the control surface 24 or sections thereof. As will be described in more detail below, the vehicle side deflector 20 is configured such that when selective air pressure is supplied to the at least one motor 28, the control surface 24 or sections thereof changes its configuration or its orientation with respect to the air flow, thereby affecting the air flow with respect to the vehicle side deflector 20.

Still referring to FIG. 1, the vehicle side deflector 20 will be described in more detail. As shown in FIG. 1, the vehicle side deflector 20 includes an integrally formed body 22 having a substantially planar outer wall 36 defining the control surface 24. The body 22 also includes an end section 40 configured for suitable mounting, and in one embodiment, a generally arcuate inner wall 44 spanning between the end section 40 and a section of the outer wall 36.

In this embodiment, the at least one pneumatic motor 28 is formed by the body 22, and includes a fluidly sealed chamber 48 delimited by end walls 50 and 52 and side walls 54 and 56, which are sections of the inner and outer walls 44 and 36, respectively. In the embodiment shown, the end wall 50 is formed as part of the end section 40 and the end wall 52 is formed by an internal bracing member that is oriented so as to from an obtuse angle with the side wall 56. In other embodiments, it will be appreciated that the end wall 52 can be oriented generally perpendicular to the side wall. As shown in FIG. 1, the side wall 54 of the pneumatic motor 28 is formed with a U-shaped section 60, the outer ends of which are connected to forward (with respect to a vehicle when installed) and rearward wall sections that are connected to end walls 50 and 52. As such, the U-shaped section 60 forms an expansion relief 62, the purpose of which will be described in more detail below. The pneumatic motor 28 further includes a fluid port 64 configured to provide fluidic access into/out of the chamber 48. In one embodiment, the fluidic port 64 includes a control valve (not shown in FIG. 1).

Figure 2A:
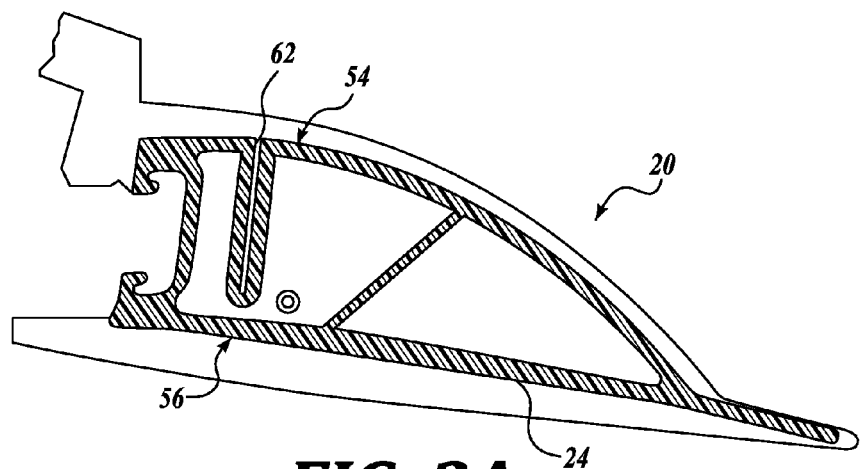
FIGS. 2A-2C illustrate various configurations of the aerodynamic device can attain dynamically during use.
Figure 2B:
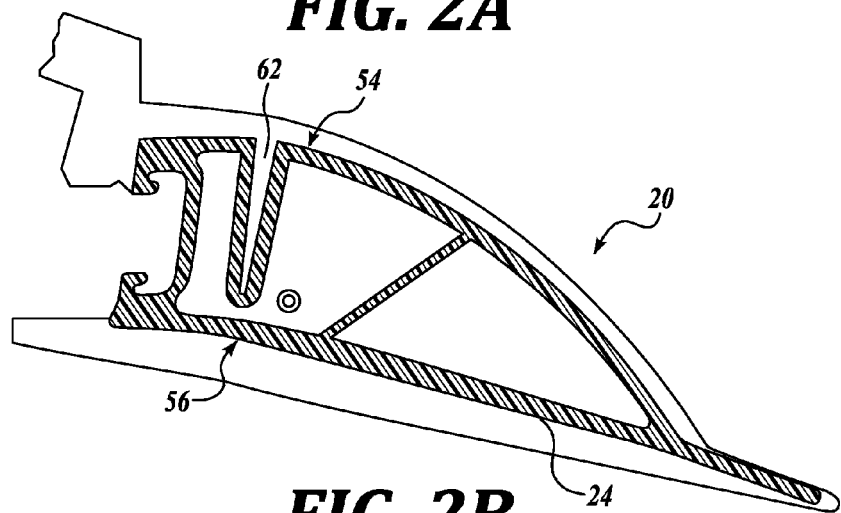
Figure 2C:
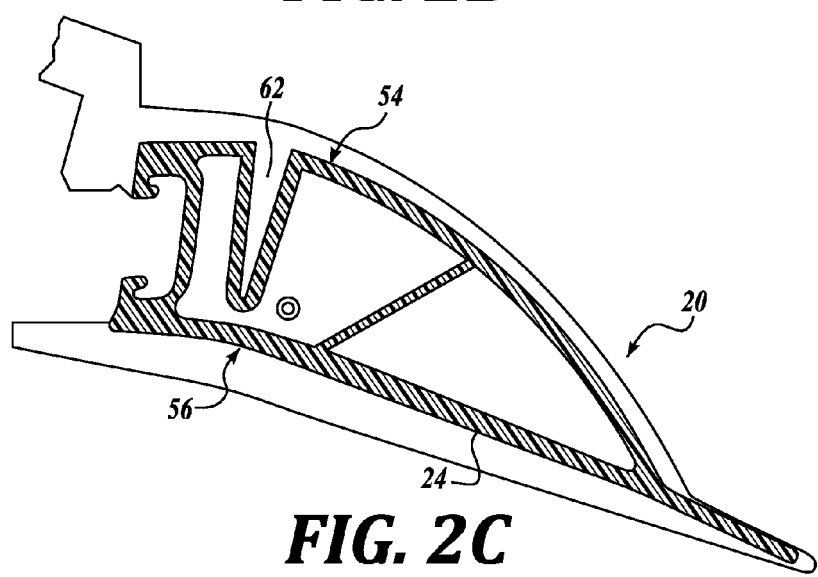

Upon air pressure selectively supplied to the pneumatic motor 28, the vehicle side deflector 20 can deflect from a first, non-deflected position shown in FIG. 2A, to one or more deflected positions shown in FIGS. 2B and 2C. In the embodiment shown, once air of sufficient pressure is injected into the chamber, forces generated by the pressurized air contained in chamber 48 and exerted against the end walls 50 and 52 induce bending to occur in side wall 56 as a result of the expansion relief 62. If desired, a relief or area of reduced strength/strain can be provided in the side wall 56 in order to further aid deflection of the vehicle side deflector 20.

Once air is vented from the pneumatic motor 28, the control surface 24 returns to the configuration of FIG. 2A based on, for example, the construction materials of the body 22. In one embodiment, the body 22 is constructed out of a thermoplastic elastomer (TPE), such as Santoprene®. To aid in returning the control surface 24 to the first, non-deflected position, a spring or other biasing means can be employed. It will be appreciated that the functionally of the spring can be engineered into areas of the body 22 in some embodiments, such as the lower area of the U-shaped section 60.

Figure 3:
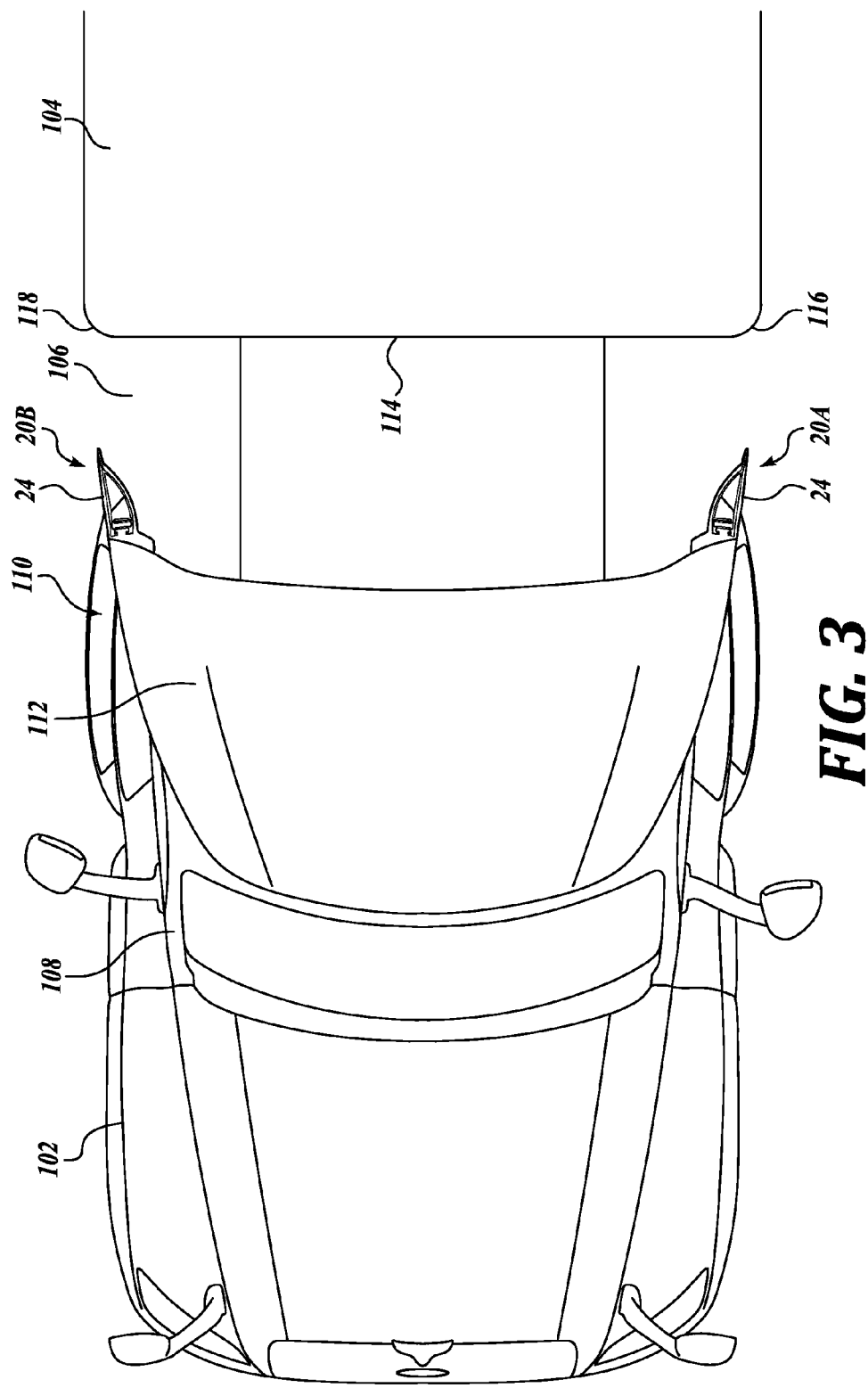
FIG. 3 illustrate aerodynamic devices of FIG. 1 installed on a vehicle, such as a tractor, in order to form vehicle side deflectors.

As installed, first and second vehicle side deflectors 20 are coupled to the sides of a tractor-trailer combination 100, as shown in FIG. 3. The vehicle side deflectors 20 or any combination of components hereinafter described may be installed on new vehicles, such as combination 100, or may be retrofitted on existing vehicles, such as combination 100. As shown in FIG. 3, the tractor-trailer combination 100 includes a tractor 102 articulatedly connected to a trailer 104 by a so-called fifth wheel (not shown), the connection therebetween forming a space or gap 106. The tractor 102 includes a conventional cab assembly 108 having a front end that generally houses an internal combustion engine that propels the combination and a rear end 110 that defines a generally vertically oriented rear wall (hidden by roof fairing 112) and left and right vertical trailing edges. The trailer 104 includes a trailer body that is generally rectangular in shape having a front wall 114.

In use, the side deflectors 20 provide improved air flow along the tractor 102 and gap 106 by delaying flow separation. As will be described in more detail below, the side deflectors 20 can also provide aerodynamic drag reduction during changing wind conditions, such as crosswind flow conditions between zero (0) and 20 degrees, and/or variable gap distances achieved, for example, via a sliding fifth wheel. The crosswind flow angle, or yaw angle, is measured from the vehicle longitudinal axis that also defines the vehicle direction of motion.

In the following description, the elements associated with the left and right side deflectors 20A and 20B are mirror images of one another. Therefore, where context permits, reference in the following description to an elements associated with one of the left or right side deflectors 20A or 20B shall also be understood as also referring to the corresponding elements in the other. A numbering scheme is used in which a suffix of "A" or "B" may be added to a reference numeral to designate a component associated with the left or right side deflector 20A or 20B, respectively, or the suffix may be omitted to refer to both simultaneously.

The side deflectors 20 may be utilized in lieu of conventional fixed cab side fairings. In the embodiment shown in FIG. 3, the side deflectors 20A and 20B are fixedly mounted at the rear end 110 of the tractor 102 in close proximity to the left and right rear vertically oriented trailing edges cooperatively formed by, for example, the roof fairing 112 and cab extender fairings (not shown). As such, the side deflectors 20A and 20B span a portion of the gap 106 extending along the sides of the combination 20 between the rear end 110 of the tractor 102 and the front wall 114 of the trailer 104. When installed, the side deflectors 20A and 20B are aligned to direct at least a portion of the airstream passing along the sides of the tractor 102 to the sides of the trailer 104. To this end, the control surfaces 24 of the side deflectors 20 are oriented to direct a portion of the airstream towards the front corners 116 and 118 of the trailer 104 where the front wall 114 of the trailer 24 intersects with the trailer side walls. Oriented as described, the side deflectors 102 are oriented substantially parallel with a longitudinal axis of the combination 100.

In one embodiment, the side deflectors 20 are of a selected length chosen to permit the tractor 102 to pivot with respect to the trailer 104 about its fifth wheel in a selected angular range without the front wall 114 of the trailer 104 contacting the side deflectors 20. The selected angular range is greater than about 45 degrees, and preferably over about 90 degrees. Ideally, the selected angular range is greater than about 180 degrees such that the tractor 102 may pivot 90 degrees to the left or right relative to the trailer without the trailer 104 impacting the side deflectors 20. In one embodiment, the side deflectors 102 may be formed from a thermoplastic elastomer (TPE), such as Santoprene®, or other rubberized material, etc. In one embodiment, the side deflectors 20 have a height substantially equal to the height of the tractor 102 and/or trailer 104. In other embodiments, the height of the side deflectors 20 is selected so as to extend only a section of the tractor 102 and/or trailer 104. In an embodiment, the control surface 24 of the side reflectors 20 matches or is substantially similar with the profile of roof fairing 112 and cab extender fairings (not shown) so as to be substantially flush at the interface therewith. While shown as a unitary body, the side deflectors 102 may be composed of two or more sections.

As was briefly described above, pressure supplied to the pneumatic motors 28 causes deflection or other configuration changes in the side deflector 20. In that regard, a source of pressurized gas, such as air, is operatively coupled in communication with the pneumatic motors via one or more ports 64. In one embodiment, the source of pressurized gas can include pressurized sources of air already existing on the vehicle, such as via an air brake system. In another embodiment, the source of pressurized gas can be a stand-alone unit comprised of a compressor and a pneumatic accumulator.

Figure 9:
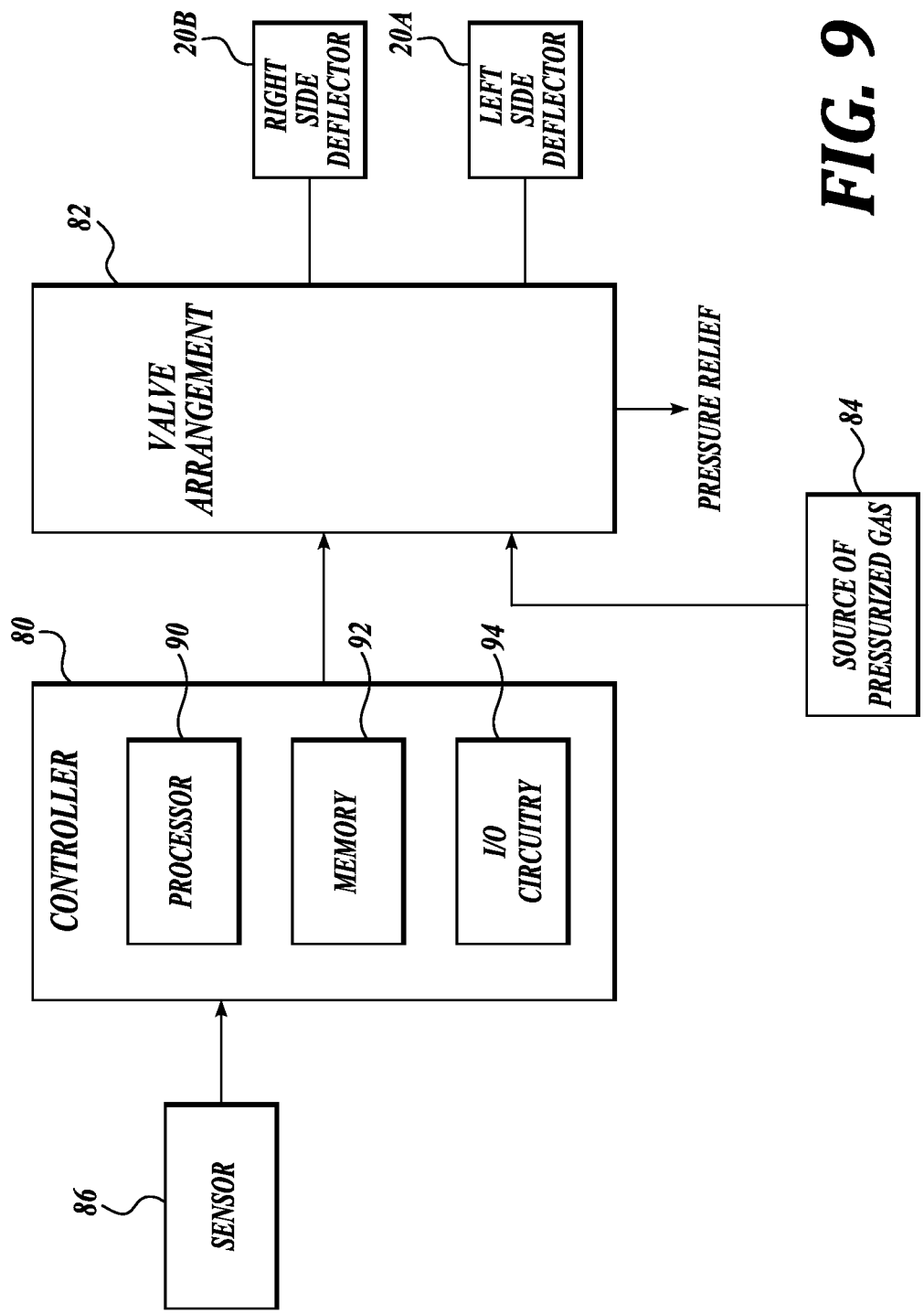
FIG. 9 is a block diagram of control components for dynamically controlling the change in configuration of an aerodynamic device's control surface.

In accordance with as aspect of the present disclosure, pressurized gas supplied to the pneumatic motors 28 of the side deflectors 20A and 20B can be controlled for selectively manipulating the configuration of the control surface 24 between a normal configuration shown in FIG. 2A, and a deflected positions shown, for example, in FIGS. 2B-2C. In that regard, a controller 80 and valve arrangement 82 is provided to selectively control the supply of pressurized gas from the pressurized gas source 84 to the chamber 48 of each pneumatic motor 28, as shown in FIG. 9. The controller 80 can be configured to independently deflect the left and/or right side deflectors 20 in a selective manner between the configurations shown in FIGS. 2A-2C. In another embodiment, the controller 80 is configured to deflect each of the side deflectors 20 the same amount.

Still referring to FIG. 8, the valve arrangement 82 includes one or more controllable valves, such as one or more solenoid actuated valves, for controlling the quantity of pressurized gas entering/exiting the at least one pneumatic motor 28. To that end, the valve arrangement 82 receives appropriate device specific control signals from the controller 80 for opening and/or closing one or more valves in order to: (1) pressurize the chamber 48 so that the configuration of the control surface 24 of the side deflector 20 changes to the configurations of, for example, FIGS. 2B-2C; (2) depressurize the chamber 48 so that the configuration of the control surface 24 changes from, for example, the configuration of FIG. 2C to the configuration of FIG. 2B, or from the configuration of FIG. 2B to the configuration of FIG. 2A.

As shown in FIG. 8, the controller 80 is electrically connected (e.g., wired or wireless) to one or more sensors 86 configured to sense the presence and magnitude of air flow, such as cross winds, with respect to the longitudinal axis of the vehicle, or the gap distance between the tractor and trailer, or both. The controller 80 receives signals indicative of cross wind conditions from the one or more cross wind sensors 86, and in response to receiving the signals from the sensors 86, the controller 80 is configured to process such signals and selectively control the valve arrangement 82. The controller 80 can alternatively or additional receive signals indicative of gap distance from one or more distance sensors 86, and in response to receiving the signals from the sensors 86, the controller 80 is configured to process such signals and selectively control the valve arrangement 82.

In order to receive the sensor signals, process such signals, and generate the appropriate device specific control signals, the controller 80 may include a logic system for determining the operation of, for example, the valve arrangement 82, which may be distinct for each attended application. It will be appreciated by one skilled in the art that the logic may be implemented in a variety of configurations, including software, hardware (analog and/or digital), and/or combinations of software and hardware. In one embodiment, the controller 80 may include a feedback system for attaining the desired amount of control surface deflection.

In one embodiment, the controller 80 may include a processor 90, a memory 92, and input/output (I/O) circuitry 94 connected in a conventional manner. The memory 92 may include random access memory (RAM), read only memory (ROM), or any other type of digital data storage means. The I/O circuitry 94 may include conventional buffers, drivers, relays, etc., and the like, for sending the device appropriate signals to the valve arrangement 82. The controller 80 can be a stand-alone controller or the functionally of controller 80 can be carried out by other controllers of the vehicle, such as the ECM, the display controller, a general purpose controller, among others.

As used herein, the term processor is not limited to integrated circuits referred to in the art as a computer, but broadly refers to a microcontroller, a microcomputer, a microprocessor, a programmable logic controller, an application specific integrated circuit, other programmable circuits, combinations of the above, among others. Therefore, as used herein, the term "processor" can be used to generally describe these aforementioned components, and can be either hardware or software, or combinations thereof, that implement logic for carrying out various aspects of the present disclosure.

Figure 4:
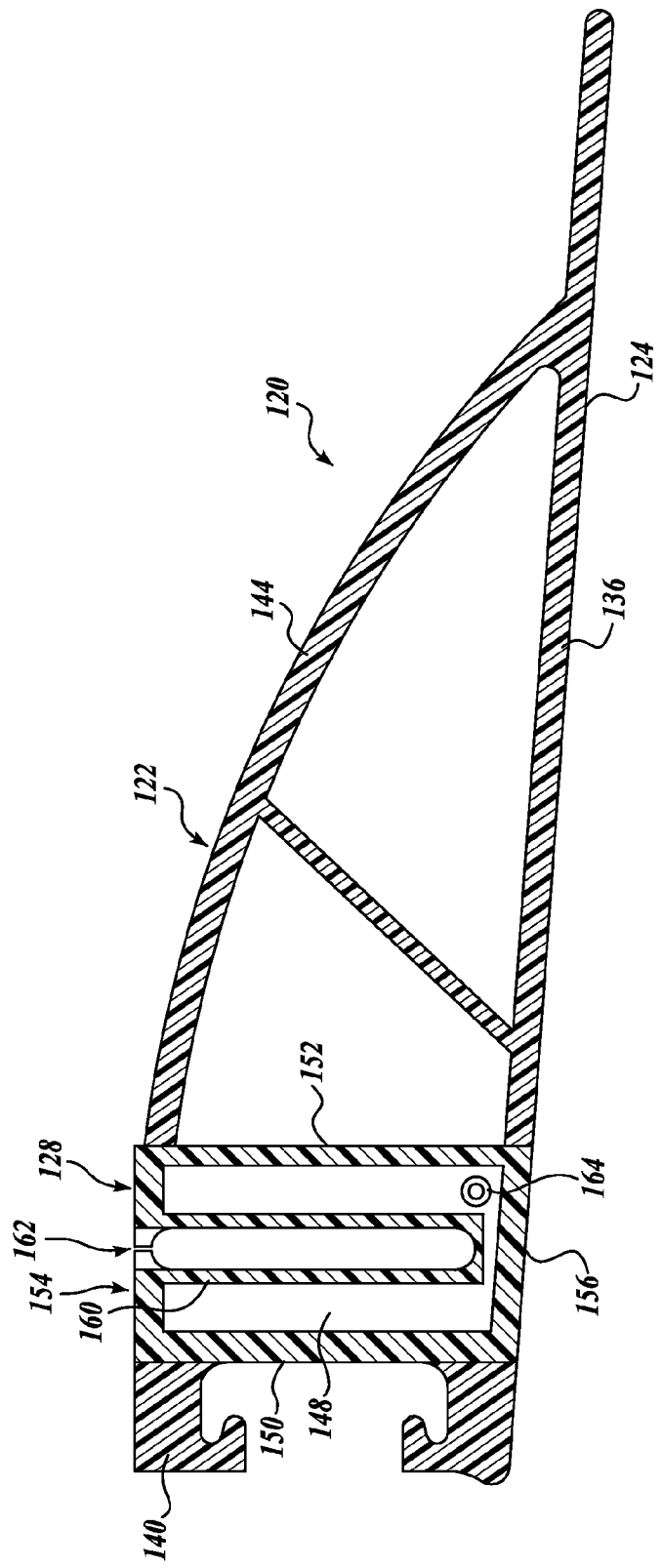
FIG. 4 illustrates another representative embodiment of an aerodynamic device in accordance with an aspect of the present disclosure.

FIG. 4 illustrates another embodiment of a vehicle side deflector 120 in accordance with aspects of the present disclosure. The vehicle side deflector 120 is similar in construction, materials, and operation to the vehicle side deflector 20 except for the differences that will now be described. As shown in FIG. 4, the pneumatic motor 128 is a discrete device mounted between an end section 140 and the remaining portions of the body 122, including the outer wall 136 and the inner wall 144. In the embodiment shown, the outer side wall 156 of the pneumatic motor 128 forms a portion of the control surface 124. As such, an outer surface of the pneumatic motor 128 is flush with and co-extensive with a surface of the outer side wall 136.

In this embodiment, the pneumatic motor 128 includes a U-shaped, fluidly sealed chamber 148 delimited by end walls 150 and 152 and inner and outer side walls 154 and 156. As shown in FIG. 4, the inner side wall 154 of the pneumatic motor 128 is formed with a U-shaped section 160, the outer ends of which are connected to end walls 150 and 152. As such, the U-shaped section 160 forms an expansion relief 162. The pneumatic motor 128 further includes a fluid port 164 configured to provide fluidic access into/out of the chamber 148. In one embodiment, the fluidic port 164 includes a control valve (not shown in FIG. 4).

Figure 5:
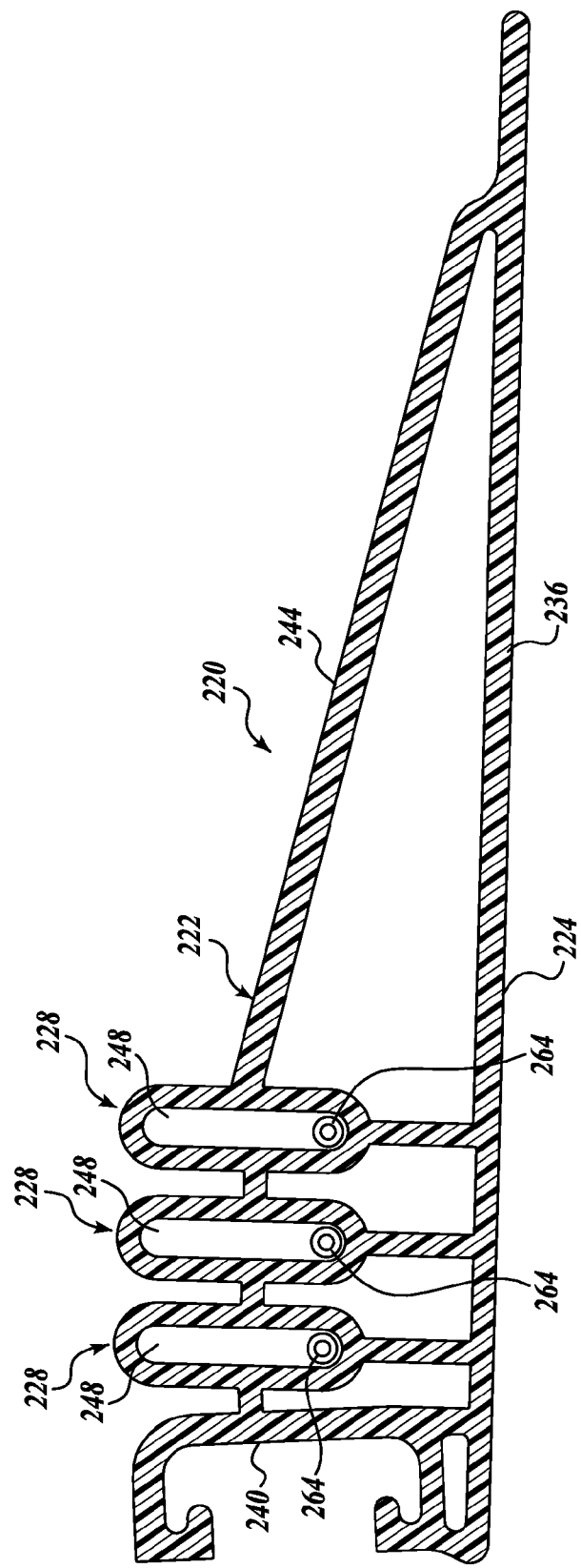
FIG. 5 illustrates another representative embodiment of an aerodynamic device in accordance with an aspect of the present disclosure.

FIG. 5 illustrates yet another embodiment of a vehicle side deflector 220 in accordance with aspects of the present disclosure. The vehicle side deflector 220 is similar in construction, materials, and operation to the vehicle side deflector 20 except for the differences that will now be described. As shown in FIG. 5, in lieu of pneumatic motor 28, another example of a pneumatic motor, generally designated 228, is employed. In the embodiment shown, a plurality of pneumatic motors 228 are integrally formed or otherwise coupled together in series between the inner side wall 244 of the body 222 and the end section 240. Each pneumatic motor 228 defines an elongated, fluid sealed chamber accessed by a port 264. In one embodiment, the controller 80 can be configured to pressurize each pneumatic motor 228 at the same time in order to realize a plurality of control surface configurations. In another embodiment, the controller can pressurize the pneumatic motors 288 serially in stages in order to realize a plurality of control surface configurations.

Figure 6:
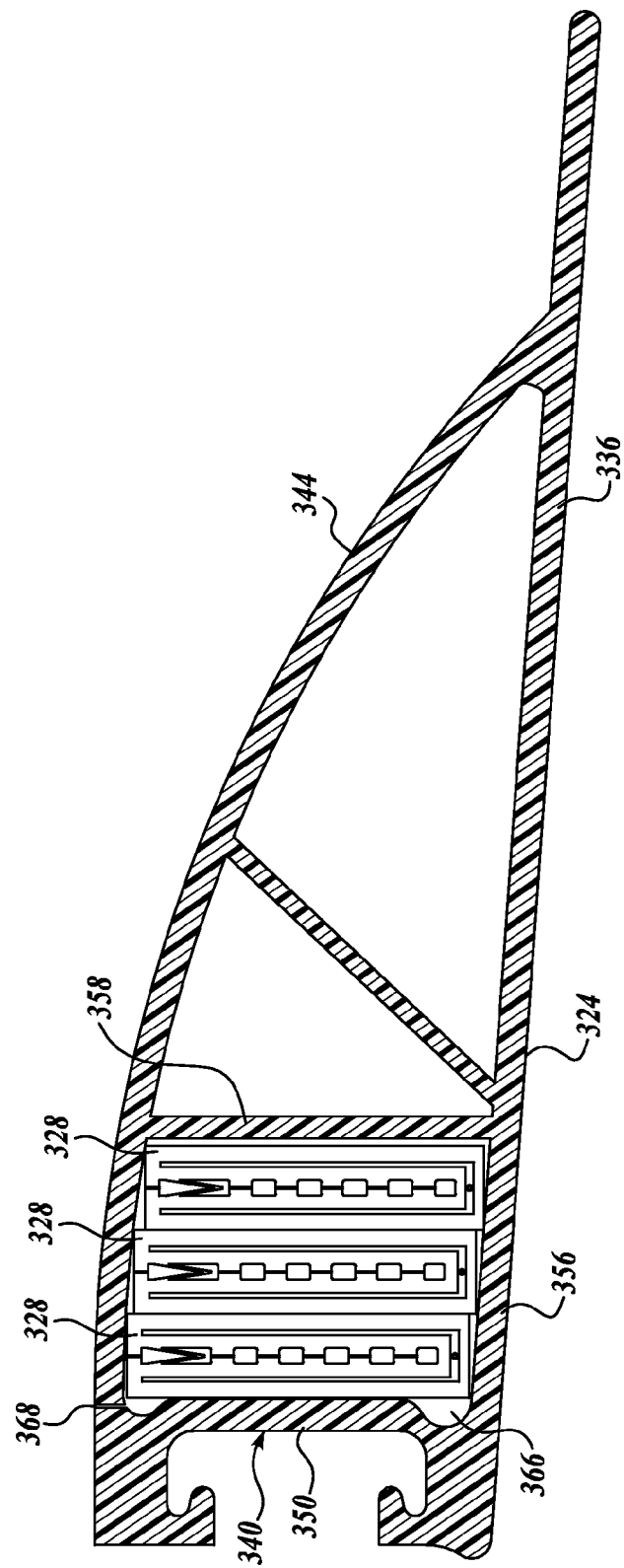
FIG. 6 illustrates another representative embodiment of an aerodynamic device in accordance with an aspect of the present disclosure.
Figure 7A:
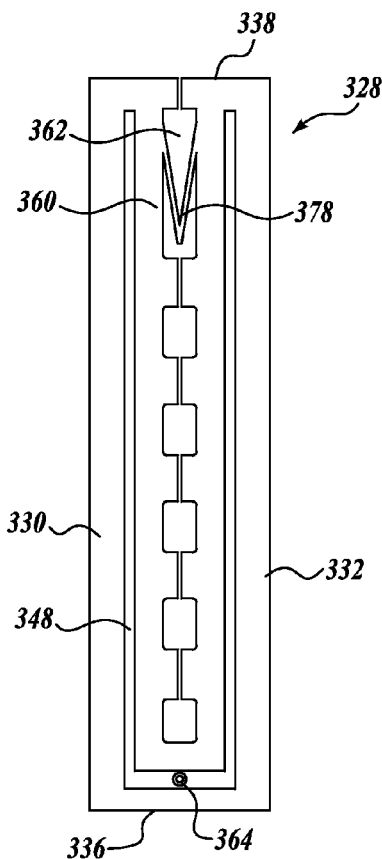
FIGS. 7A-7B illustrate first and second configurations attained by one example of a pneumatic motor that can be practiced with the aerodynamic device of FIG. 6.
Figure 7B:
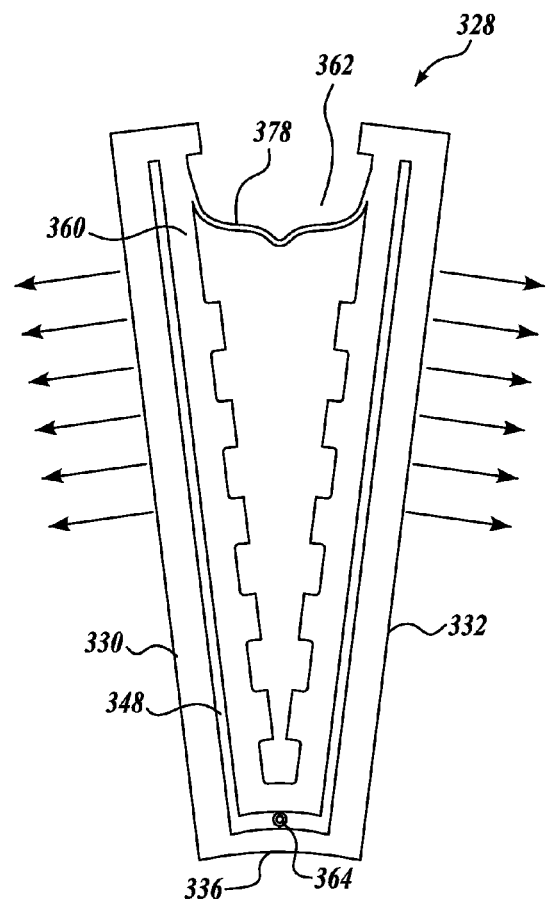

FIG. 6 illustrates still yet another embodiment of a vehicle side deflector 320 in accordance with aspects of the present disclosure. The vehicle side deflector 320 is similar in construction, materials, and operation to the vehicle side deflector 20 except for the differences that will now be described. As shown in FIG. 6, in lieu of pneumatic motor 28, another example of a pneumatic motor, generally designated 328, is employed. Turning to FIGS. 7A and 7B, the pneumatic motor 328, similar to other motors described above, includes a U-shaped, fluidically sealed chamber 348 delimited by an integrally formed or otherwise constructed body having legs 330 and 332, and outer side wall 336 and inner side wall 338. Similar to other embodiments described above, the side wall 338 is formed with a U-shaped section 360, the outer ends of which are connected to legs 330 and 332. As such, the U-shaped section 360 forms an expansion relief 362. The pneumatic motor 328 further includes a fluid port 364 configured to provide fluidic access into/out of the chamber 348. In one embodiment, the fluidic port 364 includes a control valve (not shown in FIGS. 7A and 7B).

In use, once air of sufficient pressure is injected into the chamber 348, forces generated by the pressurized air contained in chamber 348 and exerted against the legs 330 and 332 induce bending to occur in side wall 336 as a result of the expansion relief 362, as shown in FIG. 7B. The pneumatic motor 328 returns to its non-bending state of FIG. 7A once air is vented from the chamber 348 via a spring member 378 or other biasing means interconnecting the legs of the U-shaped side wall 360.

To accommodate one or more pneumatic motors 328, the body 322 in this embodiment is slightly modified. In that regard, the U-shaped section (FIG. 1) is omitted, and the inner side wall 344 of the body extends from the rearward portion of the outer side wall 336 to just distal of the end section 340. The body 322 includes an additional interior wall 358, which is generally perpendicular to the side wall section 356. As such, a generally rectangular cavity 366 is formed. A slot 368 is provided in order to provide expansion when the pneumatic motors 328 are activated. In the embodiment shown, the chamber 366 is sized and figured to receive three pneumatic motors 328 in a side-by-side configuration. It will be appreciated that the size of the chamber and/or the pneumatic motors 328 can vary such that more or less than three (3) pneumatic motors can be employed. In one embodiment, one pneumatic motor 328 is employed. In another embodiment, two (2) pneumatic motors 328 are employed. In yet another embodiment, four (4) or more pneumatic motors 328 are employed. Similar to the embodiment of FIG. 5, the controller 80 can be configured to pressurize each pneumatic motor 328 at the same time, or can pressurize each pneumatic motor 328 serially in stages in order to realize a plurality of control surface configurations.

Figure 8A:
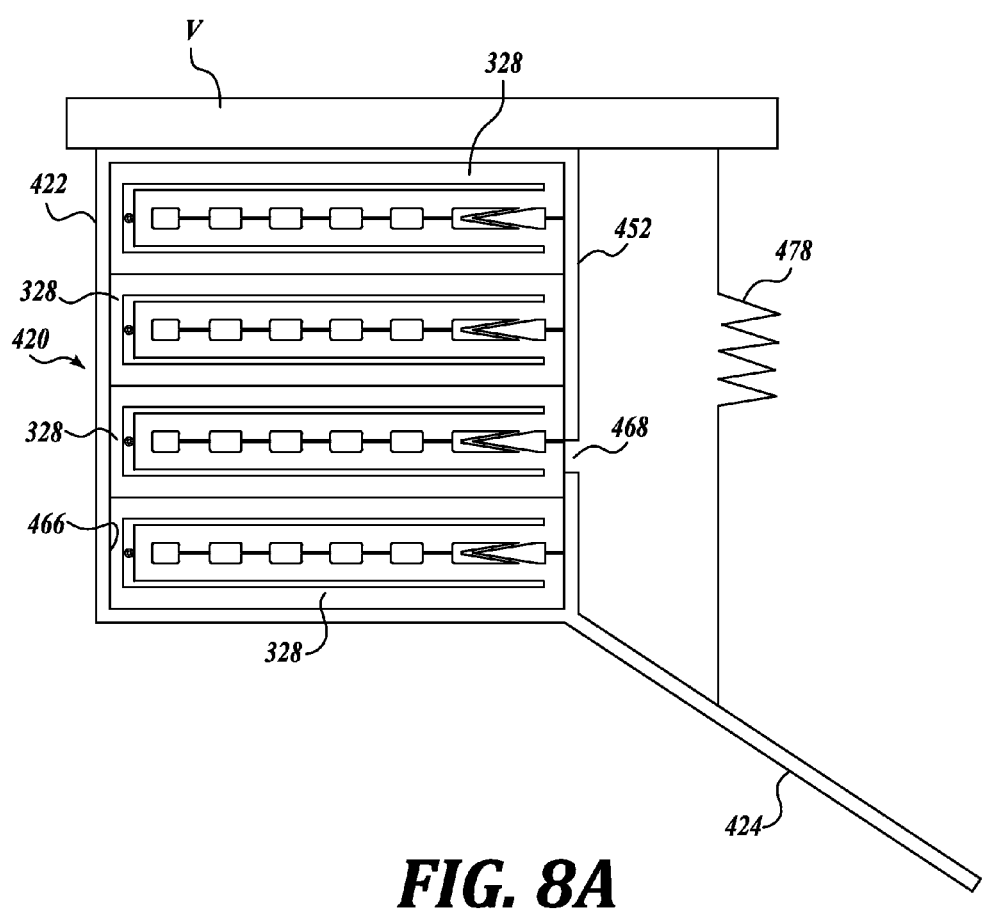
FIGS. 8A-8B illustrate another representative embodiment of an aerodynamic device in accordance with an aspect of the present disclosure.
Figure 8B:
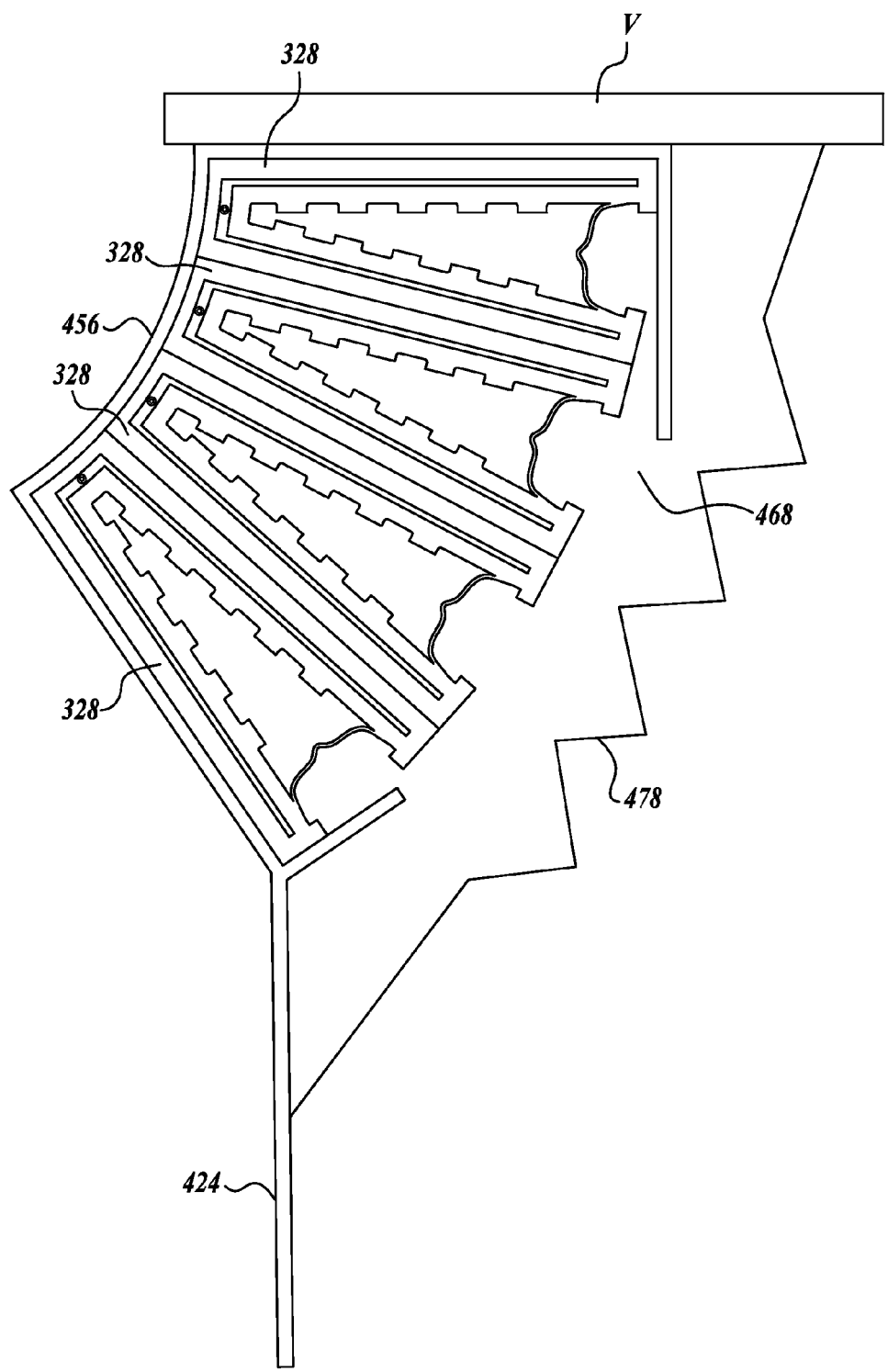

FIGS. 8A-8B illustrate another representative embodiment of a pneumatically actuated air control device in accordance with aspects of the present disclosure. The pneumatically actuated air control device in this embodiment is formed as an air dam 420 suitable for use on the front section of a vehicle V. As shown in FIG. 8A, the front air dam 420 includes a body 422 constructed of a thermoplastic material (TPE), such as Santoprene®, or other rubberized material, etc. The body 422 defines a generally rectangular cavity 466 and a control surface 424 associated with the cavity 466 that affects the air flow along the device.

The front air dam 420 further includes an at least one pneumatic motor 328 of FIG. 7A positioned within the cavity 466 and configured to alter or change the configuration of the control surface 424. In the embodiment shown, the cavity 466 is sized and figured to receive four pneumatic motors 328 in a side-by-side configuration. It will be appreciated that the size of the chamber and/or the pneumatic motors 328 can vary such that more or less than four (4) pneumatic motors can be employed. A slot 468 is provided in the end wall 452 of the body 422 in order to provide expansion when the pneumatic motors 328 are activated, as shown in FIG. 8B.

Upon selective air pressure supplied to the motors 328 via the controller 80, the front air dam 420 can deflect from a first position, shown in FIG. 8A, to a deflected, second position shown in FIG. 8B. Once air is vented from the motors 328, the control surface 428 returns to the configuration of FIG. 8A based at least in part on the construction materials of the body 422. To aid in returning the control surface 428 to the configuration of FIG. 8A, a spring 478 (shown schematically in FIGS. 8A-8B) can be employed. It will be appreciated that the spring functionally can be engineered into areas of the body in some applications. Accordingly, the air dam can realize the non-deflected configuration of FIG. 8A at low speeds, or in rough road (bumps, pot holes, etc.) conditions. At higher speeds, the air dam can be deflected to the configuration of FIG. 8B in order to reduce drag.

Various principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the claimed subject matter.

The embodiments of the invention in which an exclusive property or privilege is claimed are defined as follows:

1. An aerodynamic control device, comprising:
a body defining a control surface;
a plurality of pneumatic motors coupled to the body, each pneumatic motor comprising a sealed chamber and at least one port configured to provide access into/out of the sealed chamber, wherein the pneumatic motors are positioned with respect to the control surface such that pressurizing one or more of the plurality of sealed chambers via the respective ports results in a change in configuration of at least a portion of the control surface;
a source of pressurized gas connected in fluid communication with the port of each pneumatic motor;
a controller, at least one valve configured to selectively permit pressurized gas to be delivered to the port of each pneumatic motor, and at least one sensor, wherein the controller is configured to control the at least one valve based on the output of the at least one sensor;
wherein the controller and the at least one valve are configured to sequentially supply pressurized air to the chambers of the plurality of pneumatic motors.

2. The aerodynamic control device of claim 1, wherein the body is configured to return the control surface into an unchanged state upon de-pressurizing the sealed chambers.

3. The aerodynamic control device of claim 1, further comprising a biasing means configured to return the control surface into an unchanged state upon de-pressurizing the sealed chambers.

4. The aerodynamic control device of claim 1, wherein the controller and the at least one valve are configured to supply pressurized air to the chamber of one pneumatic motor of the plurality of pneumatic motors independently of supplying pressurized air to the others of the plurality of pneumatic motors.

5. The aerodynamic control device of claim 1, wherein the aerodynamic device is a vehicle side deflector.

6. A method for changing the configuration of a control surface, comprising:
providing an aerodynamic device including a body that defines a control surface, a plurality of pneumatic motors coupled to the body, the plurality of pneumatic motors comprising a sealed chamber and at least one port configured to provide access into/out of the sealed chamber;
sensing an aerodynamic condition;

changing the configuration of the control surface based on the sensed aerodynamic condition via a supply of pressurized gas to the sealed chamber of the at least one pneumatic motor, wherein said changing the configuration of the control surface includes selectively supplying pressurized air sequentially to at least two pneumatic motors of the plurality of pneumatic motors.

7. The method of claim 6, wherein the aerodynamic condition includes a cross wind condition or a trailer gap distance.

8. The method of claim 6, wherein the plurality of pneumatic motors includes more than two pneumatic motors.

* * * * *